Patented Apr. 15, 1952

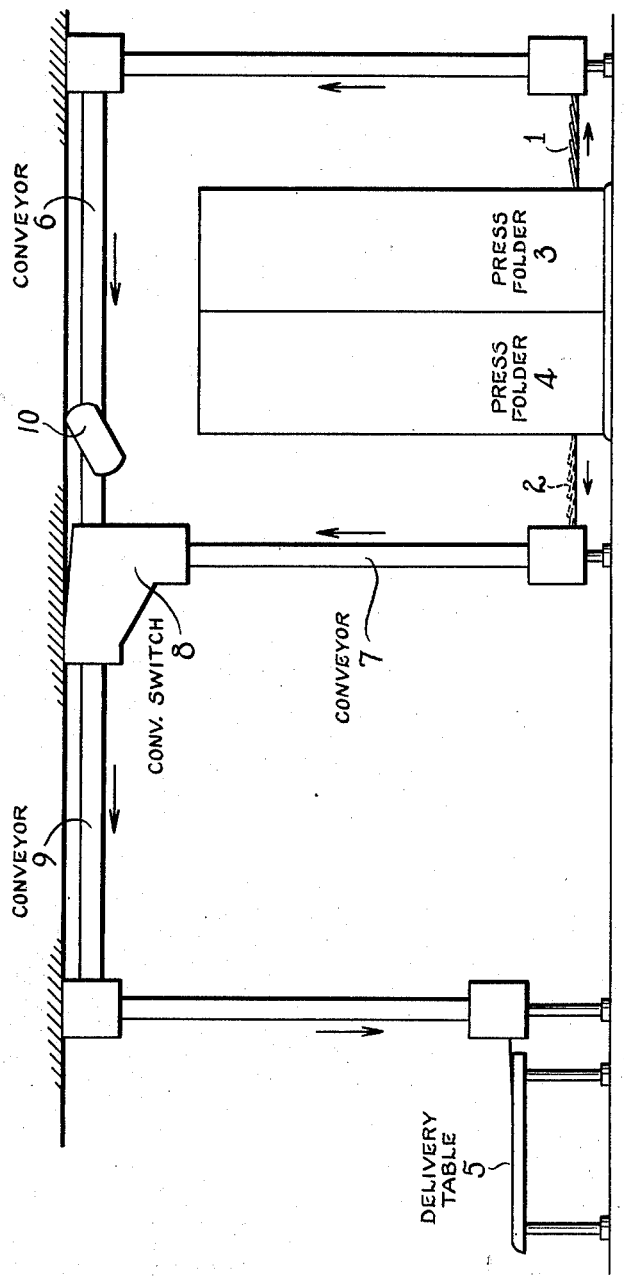

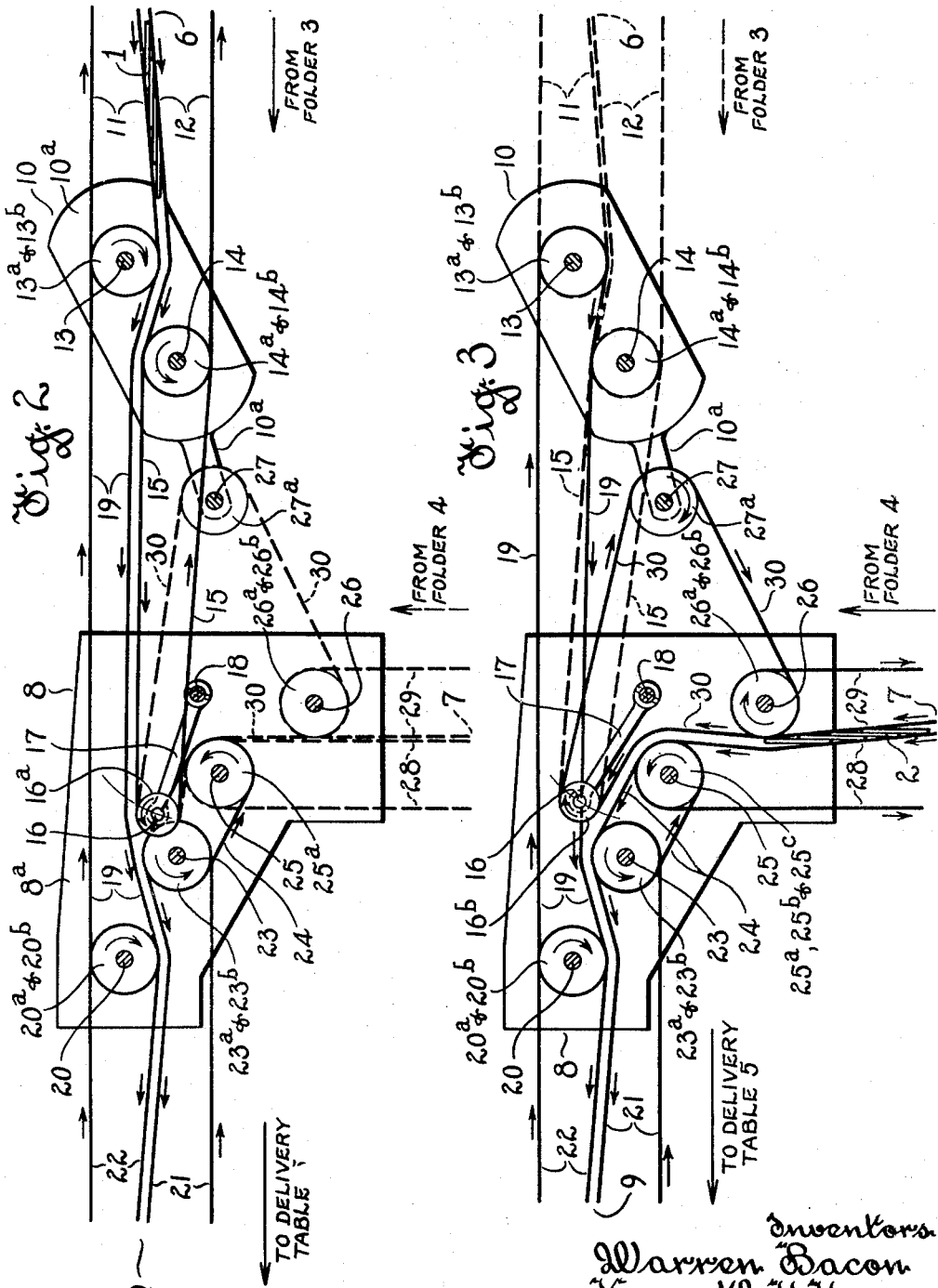

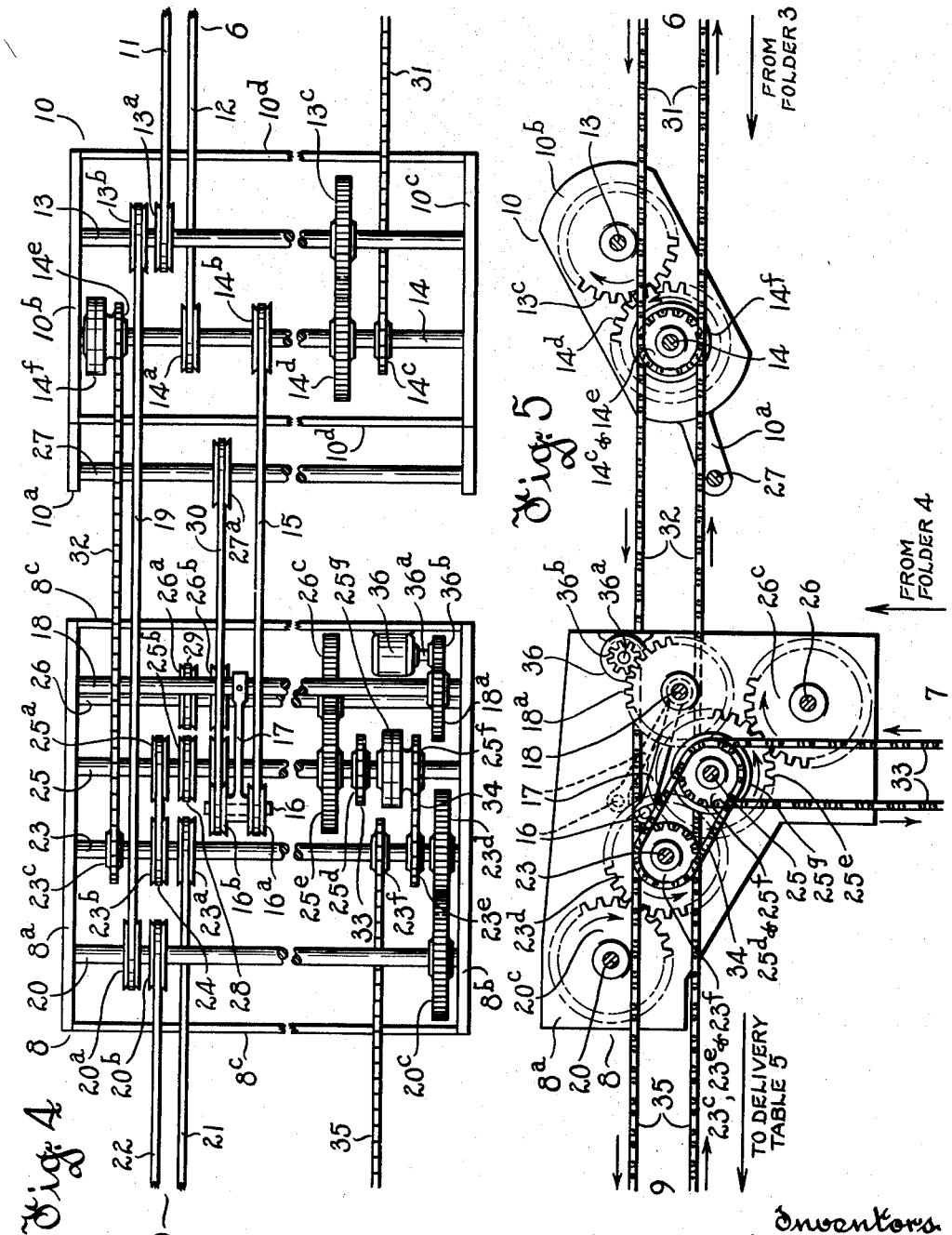

2,593,242

UNITED STATES PATENT OFFICE 2,593,242

SWITCHING TYPE CONVEYER

Warren Bacon, Chicago, Ill., and Kenneth H. Hansen, White Plains, N. Y., assignors to Cutler-Hammer, Inc., Milwaukee, Wis., a corporation of Delaware Application February 21, 1947, Serial No. 730,012

13 Claims. (Cl. 198—79)

This invention relates to conveyor systems for newspapers and other articles, and more particularly to systems affording switching.

An object of this invention is to provide an improved conveyor system comprising at least three conveyor sections and switching means to place in series relationship either of two of said sections and a section common thereto.

Another object is to provide an improved system for conveying papers from either of two folders to a common delivery table.

Another object is to provide for continuous positive movement of the selected paper stream throughout its transfer from one conveyor section to another section.

Another object is to provide upon establishment of series relationship of either set of conveyor sections driving connections whereby one section supplies driving power to the other.

Another object is to provide switching means shiftable by power into either of two operating positions.

Other objects and advantages of the invention will hereinafter appear.

In order that the invention may be more clearly understood, a conveyor system incorporating the invention will now be described, reference being made to the accompanying drawings, and it being understood that the system shown is susceptible of modification without departing from the scope of the appended claims.

In the drawings,

Figure 1 is a diagrammatic showing of coordination of a switch with two folders and a common delivery table, the elements being shown only in outline;

Fig. 2 is a more or less schematic view showing in some detail the switch and portions of the system adjacent the switch;

Fig. 3 is like Fig. 2, but shows the switch in a different operating position;

Fig. 4 is a more or less schematic showing of the switch and that portion of the conveyor system shown in Figs. 2 and 3 viewed at right angles thereto and showing the conveyor drive transfer mechanism and the conveyor pulley and belt arrangement, and Fig. 5 is in general similar to Figs. 2 and 3 but omitting the conveyor belts and showing driving connections.

Referring to Fig. 1, it shows two distinct streams of papers 1 and 2 to be delivered from their respective press folders 3 and 4, non-concurrently, to a common delivery table 5. When folder 3 is operating, stream 1 is to be conveyed by a conveyor 6 into a conveyor switch unit 8 for transfer to a common conveyor 9 which extends from the switch to delivery table 5. When folder 4 is operating, stream 2 is to be conveyed by a conveyor 7 into switch unit 8 for transfer to the common conveyor 9 and delivery to the table 5. As will be understood, switch unit 8 will only take the two paper streams non-concurrently and must be set according to the selection of paper stream to be delivered to table 5. When the switch is positioned to effect transfer of the selected stream, the folder and conveyor for the other stream should be rendered idle.

Referring to Fig. 2, it shows the pulley and belt arrangement of switch 8 and of conveyors 6, 7 and 9 adjacent to switch unit 8. When switch unit 8 is in the operating condition shown it will transfer papers from conveyor 6 to conveyor 9 when the folder 3 is operating. Conveyors 7 and 9 have end pulleys in the switch unit 8. Conveyor 6 terminates at a section joint 10, adjacent to and at the right of switch unit 8. Section joint 10 per se is not a part of the instant invention, but as will later appear its use simplifies the switching combination and is in this instance provided with an additional pulley forming part of the switching means. It will be apparent to those skilled in the art that the mechanism of the section joint 10 can be incorporated in the switch unit if desired.

The conveyor 6 comprises belts 11 and 12 running on respective end pulleys 13a and 14a fixed on shafts 13 and 14 carried by section joint 10. A divertible belt 15 runs on a pulley 14b fixed on shaft 14 and a free running pulley 16a on a short shaft 16 carried by an arm 17 rigidly fixed to a shaft 18 carried by the switch unit 8. A belt 19 runs on a free running pulley 13b on shaft 13 and on a pulley 20a fixed on a shaft 20 mounted in switch unit 8. Conveyor 9 comprises belts 21 and 22 running on respective end pulleys 23a and 20b fixed on shafts 23 and 20 mounted in switch unit 8. A belt 24 runs on a pulley 23b fixed on shaft 23 and on a free running pulley 25a on a shaft 25 mounted in switch unit 8.

When the arm 17 is positioned as shown, the belt 15 is positioned in a cooperating relation with belt 19 and said belts together form a transfer section into the switch unit 8 from conveyor 6. Belts 19 and 15 jointly form a transfer section within switch unit 8 for conveying the paper run from the first mentioned transfer section to belts 21 and 22 of conveyor 9. As will later appear, shafts 23, 25 and 20 derive driving power from shaft 14 of conveyor 6.

Also as shown in Fig. 2, the switching means comprises additional pulleys and belts, the same being idle under the conditions just described. Shaft 25 carries an end pulley for belt 28 of conveyor 7 and the switch unit has an additional shaft 26 carrying an end pulley for belt 29 of conveyor 7. The section joint 10 carries a swinging frame 10$^a$ supporting a shaft 27 having a free running pulley 27$^a$ on which runs a belt 30. The belts 28, 29, 30 here shown in broken lines are more fully shown in Fig. 3 now to be described.

Referring to Fig. 3, it shows the switch unit in an operating condition to provide for transfer of stream 2 from conveyor 7 to conveyor 9 when folder 4 is operating. Conveyor 7 as aforementioned comprises belts 28 and 29 which run on respective end pulleys 25$^b$ and 26$^a$ fixed on shafts 25 and 26. Belt 30 as aforementioned runs on free running pulley 27$^a$ and additionally it runs on a second free running pulley 16$^b$ on the short shaft 16, and on a driving pulley 26$^b$ on shaft 26. Belt 30 also bears against a free running pulley 25$^c$ on shaft 25 whenever there is an absence of a flow of papers into the switch unit from conveyor 7. Belts 19, 21, 22 and 24 respectively function as described in connection with Fig. 1. Belts 11, 12 and 15 (shown as broken lines) are idle and shafts 13 and 14 are idle.

When arm 17 is positioned as shown in Fig. 3 the diverter belt 30 is positioned in a cooperating relation with belts 28 and 24 to form a transfer section within switch unit 8 and it provides for conveyance of the paper stream 2 from conveyor 7 to the aforedescribed transfer section, comprising belts 19 and 21, which in turn effects transfer of the paper stream to belts 21 and 22 of common conveyor 9. As will later appear, shafts 23 and 20 derive driving power from shaft 26 of conveyor 7.

Referring to Fig. 4, it shows in plan the various belts, pulleys, and the belt shifting arm 17, described in connection with Figs. 2 and 3. Only one set of belts and associated pulleys and only one belt shifting arm are shown but as will be apparent to those skilled in the art they are representative of a plurality of such belts, pulleys and belt shifting arms which in practice are suitably plural and spaced across the path of the paper stream to be handled. The belts are assumed to be of the usual coiled wire type.

Figs. 4 and 5 considered together will afford an understanding of driving connections from the conveyors 6 and 7 to the aforementioned driven pulleys and also of the power means provided to change the operating condition of the switch unit.

Conveyor 6 has a chain 31 which drives a sprocket wheel 14$^c$ fixed on shaft 14. Meshing gears 13$^c$ and 14$^d$ are fixed on their respective shafts 13 and 14. A chain 32 driven by a sprocket wheel 14$^e$ fixed on an overrunning clutch 14$^f$ which is mounted on shaft 14 drives a corresponding fixed sprocket wheel 23$^c$ on shaft 23. Meshing gears 23$^d$ and 20$^c$ are fixed on their respective shafts 23 and 20.

Conveyor 7 has a chain 33 which drives a sprocket wheel 25$^d$ fixed on shaft 25. Meshing gears 25$^e$ and 26$^c$ are fixed on their respective shafts 25 and 26. A chain 34 driven by a sprocket wheel 25$^f$ mounted on an overrunning clutch 25$^g$ on shaft 25 drives a corresponding sprocket wheel 23$^e$ on shaft 23. A chain 35 driven by a sprocket wheel 23$^f$ fixed on shaft 23 provides the power drive for conveyor 9.

An electric motor 36 is provided in switch unit 8 as a preferred means of shifting the conveyor switch from one operating position to the other. Motor 36 is mounted in a suitable manner so that its rotor shaft 36$^a$ is in a coplanar relationship with shaft 18. A pinion 36$^b$ fixed on shaft 36$^a$ meshes with a gear 18$^a$ fixed on shaft 18. Motor 36 can be controlled in a suitable manner to run in reverse directions so as to position arm 17 in either of the two positions shown in Figs. 2 and 3. It is apparent that the shaft 18 can be rotated by manual means, as by a crank or a lever to position arm 17 in either of the two operating positions.

Referring to Figs. 2, 4 and 5, when folder 3 is operating and it is desired to convey stream 1 to conveyor table 5 switch unit 8 is conditioned as shown in Fig. 2 and the drive from conveyor 6 through switch unit 8 to conveyor 9 then becomes effective. Chain 31 will drive the sprocket 14$^c$ in the counterclockwise direction and cause the shaft 14 to rotate in the same direction. Shaft 13 will rotate in the clockwise direction through the drive of the gear of 13$^c$ by gear 14$^d$. Adjacent portions of belts 11 and 12 of conveyor 7 will therefore carry stream 1 into section joint 10. When shaft 14 rotates counter-clockwise overrunning clutch 14$^f$ engages and the chain 32 is driven by the sprocket 14$^e$ and in turn drives sprocket 23$^c$ in the counterclockwise direction, thereby causing the shaft 23 to rotate in the same direction. Shaft 20 simultaneously rotates in clockwise direction through the drive of the gear 20$^c$ by the gear 23$^d$. Adjacent portions of the belts 15 and 19 therefore carry the stream 1 from the section joint 10 into switch unit 8 where it is transferred to adjacent portions of the belts 19 and 21, and then to adjacent portions of the belts 21 and 22 of conveyor 9. Chain 34 will be running and will drive sprocket 25$^f$ but shaft 25 will not rotate as clutch 25$^g$ will be overrunning. Therefore belts 28 and 29 will be idle.

Referring to Figs. 3, 4 and 5, when it is desired to convey stream 2 from folder 4 to delivery table 5 the conveyor switch unit 8 is conditioned as shown in Fig. 3 and the drive for conveyor 9 is from conveyor 7 by means of the chain 33. Chain 33 drives sprocket 25$^d$ counterclockwise, causing shaft 25 to rotate in the same direction. Shaft 26 then is rotated clockwise through drive of gear 26$^c$ by gear 25$^e$. Therefore adjacent portions of belts 28 and 29 will carry stream 2 from the folder 4 into the switch unit 8. When shaft 25 is driven by chain 33 the clutch 25$^g$ engages and drives sprocket 25$^f$ which drives chain 34. Chain 34 in turn drives the sprocket 23$^e$ thereby rotating the shaft 23 counterclockwise to impart corresponding motion to belt 24. On the other hand, the aforementioned clockwise drive of shaft 26 effects drive of belt 30. Therefore, adjacent portions of belts 30 and 28 and of belts 30 and 24 will carry the stream 2 to the transfer section comprising belts 19 and 21. Shaft 20 rotates in the clockwise direction through the drive of the gear 20$^c$ by the counterclockwise rotating gear 23$^d$. Therefore the adjacent portions of belts 19 and 21 and of belts 21 and 22 will move outwardly from switch unit 8 to convey stream 2 to table 5. Chain 32 will be running on sprockets 23$^c$ and 14$^e$ but the shaft 14 will not rotate as the clutch 14$^f$ will be overrunning. Therefore belts 11 and 12 will be idle.

Preferred forms of supporting framework for switch unit 8 and section joint 10 are shown schematically in Figs. 2, 3, 4 and 5. The frame of switch unit 8 comprises the shaft bearing side members 8ª and 8ᵇ which are held in a fixed parallel relationship with one another as by a plurality of perpendicular struts 8ᶜ. Similarly, the frame of section joint 10 comprises shaft bearing side members 10ᵇ and 10ᶜ which are held in a rigid fixed parallel relationship with one another as by a plurality of perpendicular struts 10ᵈ.

What we claim as new and desire to secure by Letters Patent is:

1. The combination with a plurality of conveyors comprising a first, second and third, each being of the belt and pulley type, of switching means of the belt and pulley type selectively to place in series relation said first and second conveyors or said first and third conveyors, said belts of said conveyors with the belts of said switching means providing in either case a continuous run having throughout adjacent belts to receive and grip therebetween the articles to be conveyed, and driving connections between pulleys of said switching means and of the conveyors which it places in series relation.

2. The combination with a plurality of conveyors comprising a first, second and third, each being of the belt and pulley type, of switching means of the belt and pulley type selectively to place in series relation said first and second conveyors or said first and third conveyors, said switching means having separate sets of belts having unlike paths of travel afforded active positions selectively according to the conveyor relationship to be established and said belts of said conveyors with the belts of said switching means providing in either case a continuous run having throughout adjacent belts to receive and grip therebetween the articles to be conveyed.

3. The combination with a plurality of conveyors comprising a first, second and third, each being of the belt and pulley type, of switching means of the belt and pulley type selectively to place in series relation said first and second conveyors, or said first and third conveyors, said switching means having belts made active thereby selectively according to the conveyor relationship to be established and said belts of said conveyors with the belts of said switching means providing in either case a continuous run having throughout adjacent belts to receive and grip therebetween the articles to be conveyed, and driving connections between pulleys of said switching means and of the conveyors which it places in series relation.

4. For a conveyor system of the pulley and belt type having at least three separate conveyor sections, switching means comprising pulleys and belts on said pulleys to place in a series relation either of two conveyor sections and a third conveyor section, certain of the pulleys of said switching means being coaxial and adjustable for change of their common axis and belts of said switching means having unlike paths of travel but having running engagement with said coaxial pulleys to be shifted into and out of their effective positions, certain of the latter belts being ineffective when other of the same are effective and vice versa.

5. For a conveyor system of the pulley and belt type having at least three separate conveyor sections, switching means comprising pulleys and belts on said pulleys to place in a series relation either of two conveyor sections and a third conveyor section, certain of the pulleys of said switching means being coaxial and adjustable for change of their common axis and belts of said switching means having unlike paths of travel but having running engagement with said coaxial pulleys to be shifted into and out of their effective positions, certain of the latter belts being ineffective when other of the same are effective and vice versa, and said switching means additionally comprising a motor for effecting adjustments of said adjustable coaxial pulleys.

6. The combination with first, second and third conveyor sections of the pulley and belt type, each having for gripping therebetween articles to be conveyed, first and second belts, of belts interconnecting said first and second conveyor sections and said first and third conveyor sections for continuity therebetween in respect of the first belts of said first and second conveyor sections and the second belts of said first and third conveyor sections, a set of pulleys located between said belts interconnecting the conveyor sections and having adjustable support for movement into proximity to such belts selectively, pulleys concentric with end pulleys of the second belts of said second and third conveyor sections respectively, and belts having running engagement with said adjustable pulleys and dividingly having running engagement with said pulleys concentric with said end pulleys of said second and third conveyor sections for switching.

7. The combination with first, second and third conveyor sections of the pulley and belt type, each having for gripping therebetween articles to be conveyed, first and second belts, said first and second conveyor sections being arranged in a substantially straight line relation and said third conveyor section being disposed at an angle thereto, of belts interconnecting said first and second conveyor sections and said first and third conveyor sections for continuity therebetween in respect of the first belts of said first and second conveyor sections and the second belts of said first and third conveyor sections, a set of pulleys located between said belts interconnecting the conveyor sections and having adjustable support for movement into proximity to such belts selectively, pulleys concentric with end pulleys of the second belts of the second conveyor section and of the first belts of the third conveyor section respectively, belts having running engagement with said adjustable pulleys and dividingly having running engagement with said pulleys concentric with said end pulleys of said second and third conveyor sections for switching, and a pulley element adjacent the end of said second conveyor section for engagement by such of said switching belts as extend from said third conveyor section to said adjustable pulley set.

8. The combination with first, second and third conveyor sections of the pulley and belt type, each having for gripping therebetween articles to be conveyed, first and second belts, said first and second conveyor sections being arranged in a substantially straight line relation and said third conveyor section being disposed at an angle thereto, of belts interconnecting said first and second conveyor sections and said first and third conveyor sections for continuity therebetween in respect of the first belts of said first and second conveyor sections and the second belts of said first and third conveyor sections, a set of pulleys located between said belts interconnecting the conveyor sections and having adjustable support for movement into proximity to such belts selectively, pulleys concentric with end pulleys of the second belts of said second conveyor section and of the first belts of said third conveyor section respectively, belts having running engagement with said adjustable pulleys and dividingly having running engagement with said pulleys concentric with said end pulleys of said second and third conveyor sections for switching, and a section joint affording support for pulleys of said second conveyor section and comprising a pulley element for engagement by such of said switching belts as extend from said third conveyor section to said adjustable pulley set.

9. The combination with first, second and third conveyor sections of the pulley and belt type, each having for gripping therebetween articles to be conveyed, first and second belts, said first and second conveyor sections being arranged in a substantially straight line relation and said third conveyor section being disposed at an angle thereto, of belts interconnecting said first and second conveyor sections and said first and third conveyor sections for continuity therebetween in respect of the first belts of said first and second conveyor sections and the second belts of said first and third conveyor sections, a set of pulleys located between said belts interconnecting the conveyor sections and having adjustable support for movement into proximity to such belts selectively, pulleys concentric with end pulleys of the second belts of said second conveyor section and of the first belts of said third conveyor section respectively, belts having running engagement with said adjustable pulleys and dividingly having running engagement with said pulleys concentric with said end pulleys of said second and third conveyor sections for switching, a frame having mounted thereon said adjustable set of pulleys and also affording said first and third conveyor sections support for an end set of pulleys for the first and second belts of each together with said pulleys concentric therewith, and a second frame affording said second conveyor section support for an end set of pulleys for its first and second belts, said second frame also having mounted thereon a pulley element for engagement by such of said switching belts as extend from said third conveyor section to said adjustable set of pulleys.

10. The combination with a plurality of conveyor sections of the pulley and belt type comprising two separately driven sections and an additional section to be placed in series relation with said two sections selectively and to derive therefrom selectively driving power, of switching means of the pulley and belt type to place said conveyor sections in the aforementioned relations selectively, driving connections for transmitting driving power from said two conveyor sections selectively to pulleys of said switching means and of said additional conveyor section, and two supporting frames which afford support for rotating parts of said driving connections and also for pulleys of said conveyor sections and switching means, to afford two units through the medium of which the said three conveyor sections may be coordinated as aforedescribed by mere additions of belts and driving chains.

11. The combination with a plurality of conveyor sections of the pulley and belt type and comprising two separately driven sections and an additional section to be placed in series relation with said two sections selectively and to derive therefrom selectively driving power, of switching means of the pulley and belt type to place said conveyor sections in the aforementioned relations selectively, and driving connections for transmitting driving power from said two conveyor sections selectively to pulleys of said switching means and of said additional conveyor section.

12. The combination with a plurality of conveyor sections of the pulley and belt type and comprising two separately driven sections and an additional section to be placed in series relation with said two sections selectively and to derive therefrom selectively driving power, of switching means of the pulley and belt type to place said conveyor sections in the aforementioned relations selectively, and driving connections for transmitting driving power from said two conveyor sections selectively to pulleys of said switching means and of said additional conveyor section, said driving connections including overrunning clutches adapting the same to drive by either of said two conveyor sections with the other of said two sections idle.

13. The combination with a plurality of conveyor sections of the pulley and belt type and comprising two separately driven sections and an additional section to be placed in series relation with said two sections selectively and to derive therefrom selectively driving power, of switching means of the pulley and belt type to place said conveyor sections in the aforementioned relations selectively, driving connections for transmitting driving power from said two conveyor sections selectively to pulleys of said switching means and of said additional conveyor section, said driving connections including overrunning clutches adapting the same to drive by either of said two conveyor sections with the other of said two sections idle, and two supporting frames which afford support for rotating parts of said driving connections including said overrunning clutches thereof and also for pulleys of said conveyor sections and switching means, to afford two units through the medium of which the said three conveyor sections may be coordinated as aforedescribed by mere addition of belts and driving chains.

WARREN BACON.
KENNETH H. HANSEN.

REFERENCES CITED

The following references are of record in the file of this patent:

UNITED STATES PATENTS

| Number | Name | Date |
|---|---|---|
| 1,245,728 | Jennings | Nov. 6, 1917 |
| 1,858,416 | Rapley | May 17, 1932 |